United States Patent
Ishii et al.

(12)

(10) Patent No.: US 6,705,176 B2
(45) Date of Patent: Mar. 16, 2004

(54) ELECTRIC POWER STEERING APPARATUS

(75) Inventors: Yasuhiro Ishii, Osaka (JP); Osamu Sano, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/378,738

(22) Filed: Mar. 5, 2003

(65) Prior Publication Data
US 2003/0136211 A1 Jul. 24, 2003

Related U.S. Application Data

(62) Division of application No. 09/655,847, filed on Sep. 6, 2000.

(30) Foreign Application Priority Data
Jul. 27, 1998 (JP) ............................................ 10-210994

(51) Int. Cl.⁷ ............................................ F16H 35/00
(52) U.S. Cl. ..................... 74/388 PS; 74/409; 74/440; 74/425
(58) Field of Search ............................ 74/388 PS, 409, 74/425, 440

(56) References Cited

U.S. PATENT DOCUMENTS

| 4,040,307 A | | 8/1977 | Koster | |
| 4,541,294 A | * | 9/1985 | Byers | 74/89.14 |
| 4,586,393 A | | 5/1986 | Mooney et al. | |
| 4,748,865 A | * | 6/1988 | Umezawa et al. | 74/411 |
| 4,827,790 A | | 5/1989 | Bisiach | |
| 5,653,144 A | * | 8/1997 | Fenelon | 74/411 |
| 5,761,964 A | * | 6/1998 | Yamada et al. | 74/425 |
| 5,878,832 A | * | 3/1999 | Olgren et al. | 180/444 |
| 5,956,998 A | * | 9/1999 | Fenelon | 74/89.17 |
| 6,003,397 A | * | 12/1999 | Yasuhira | 74/425 |
| 6,016,716 A | * | 1/2000 | Mauro | 74/409 |
| 6,044,723 A | | 4/2000 | Eda et al. | |
| 6,357,313 B1 | * | 3/2002 | Appleyard | 74/388 PS |
| 2002/0096005 A1 | * | 7/2002 | Oka et al. | 74/388 PS |

FOREIGN PATENT DOCUMENTS

| JP | 11048995 A | * | 2/1999 | B62D/5/04 |
| JP | 2000-43739 A | | 2/2000 | |
| WO | WO 99/11502 A1 | | 3/1999 | |

* cited by examiner

Primary Examiner—David Fenstermacher
(74) Attorney, Agent, or Firm—Birch, Stewart, Kolasch & Birch, LLP

(57) ABSTRACT

An electric power steering apparatus in which steering assistance is achieved by transmitting a rotary motion of an electric motor for steering assistance to a steering shaft on which a worm wheel is mounted through a worm shaft on which a worm is mounted, wherein the worm shaft is deflectable toward the worm wheel and equipped with a biasing member biasing the worm shaft in the deflective direction thereof, or alternatively, the worm wheel is deflectable toward the worm shaft and equipped with a biasing member biasing the worm wheel in the deflective direction thereof.

1 Claim, 9 Drawing Sheets

ELECTRIC POWER STEERING APPARATUS

This application is a divisional of co-pending application Ser. No. 09/655,847, filed on Sep. 6, 2000, the entire contents of which are hereby incorporated by reference and for which priority is claimed under 35 U.S.C. §120.

BACKGROUND OF THE INVENTION

This invention relates to an electric power steering apparatus with an electric motor as a source generating a steering-assist force.

Steering of automotive vehicles is realized by transmitting a rotary operation of a steering wheel disposed in the vehicle's cabin to a steering mechanism provided outside the cabin for adjusting directions of the wheels (generally front wheels).

The electric power steering apparatus for use in an automotive vehicle, as shown in FIG. 1, includes: a first steering shaft 102 connected to a steering wheel 101; a torque sensor 105 sensing a steering torque by a relative rotary displacement of a second steering shaft 104 to the first steering shaft 102, both being linked via a torsion bar 103; and a reduction mechanism 109 having a worm 107 and a worm wheel 108, reducing a rotary motion of an electric motor 106 for steering assistance, which is driven based on a sense result of the torque sensor 105, to transmit the reduced rotary motion to the second steering shaft 104, wherein operations of the steering mechanism responsive to the rotary motion of the steering wheel 101 are assisted by a rotary motion of the electric motor 106 so as to alleviate a physical load imposed on a driver in steering.

A worm shaft on which the worm is mounted and the second steering shaft on which the worm wheel is mounted are each supported by bearings at opposed ends in the longitudinal direction and each blocked from displacement in the radial direction and the longitudinal direction.

In a case where a worm and a worm wheel are employed as described above, there arise backlash between opposed tooth flanks. Therefore, in the prior art, when a worm shaft and a worm wheel were assembled, it was performed within machining accuracies of parts such that no backlash is produced. However, with inevitable dimensional errors inherent in a worm, a worm shaft, bearings for supporting the shaft, a worm wheel, a second steering shaft for supporting the wheel and the like, backlash was produced after the assembly with a relatively high ratio.

Further, in a recent, advanced case applied with a high-power steering-assist force, wear of teeth of the worm and the worm wheel has been increased, thereby, problematically disabling avoidance of backlash. In this case, the worm shaft and the second steering shaft are blocked in displacement, disabling adjustment of backlash, and therefore unpleasant noise caused by backlash is leaked into the cabin of an automotive vehicle.

BRIEF SUMMARY OF THE INVENTION

It is accordingly an object of the invention is to provide an electric power steering apparatus capable of properly eliminating backlash without receiving any adverse influence of dimensional errors of parts such as a worm.

It is another object of the present invention to provide an electric power steering apparatus capable of easily eliminating backlash due to increase in wear of teeth of a worm and a worm wheel.

A first aspect of the present invention is an electric power steering apparatus in which steering assistance is achieved by transmitting a rotary motion of an electric motor for steering assistance to a steering shaft on which a worm wheel is disposed through a worm shaft on which a worm is disposed, wherein the worm shaft is deflectable toward the worm wheel and equipped with a biasing member biasing the worm shaft in the deflective direction thereof.

A second aspect of the present invention is an electric power steering apparatus in which steering assistance is achieved by transmitting a rotary motion of an electric motor for steering assistance to a steering shaft on which a worm wheel is disposed through a worm shaft on which a worm is disposed, wherein the worm wheel is deflectable toward the worm shaft and equipped with a biasing member biasing the worm wheel in the deflective direction thereof.

According to such electric power steering apparatuses, the worm shaft or the worm wheel can be moved toward the worm wheel or the worm shaft by the biasing member. Therefore, backlash can be properly eliminated without receiving any adverse influence of dimensional errors of parts such as the worm to increase a production yield. In addition, even in a case where wear of teeth of the worm and the worm wheel has been increased, backlash can be properly eliminated, thereby enabling prevention of leakage of backlash noise into the cabin of an automotive vehicle.

In the electric power steering apparatus of the first aspect of the present invention, the worm shaft is deflectable in a side of the worm shaft, interlocked with an output shaft of the electric motor and an interlocking member interlocking the worm shaft and the output shaft is provided therebetween. Since the deflection of the worm shaft can be absorbed by the interlocking member, it is prevented for the deflection of the worm shaft to adversely affect a rotary characteristic of the worm shaft from occurring even if much of the deflection arises.

In the electric power steering apparatus of the first aspect of the present invention, the worm shaft is supported in a gear housing having a tapped hole, and the biasing member includes a screw body tightly fastened in the tapped hole and a spring body interposed between the screw body and the worm shaft. Even when backlash cannot be eliminated only by a force of the spring body, backlash can be properly eliminated by operating the screw body.

In the electric power steering apparatus of the first aspect of the present invention, the worm shaft is supported in a gear housing having a tapped hole, and the biasing member includes a screw body which is tightly fastened in the tapped hole and which is in contact with the worm shaft or a bearing fitted to the worm shaft. It is properly prevented for the worm shaft to move away from the worm wheel and in addition, a contact resistance between the worm and the worm wheel can be smaller than in the case where the spring body is employed, thereby, enabling the rotary characteristic of the worm wheel to improve.

In the electric power steering apparatus of the second aspect of the present invention, the worm wheel is fitted to the steering shaft, and the biasing member includes an elastic ring fitted to a fit portion of the worm wheel to the steering shaft. Since a simple structure is adopted in which the elastic ring is only fitted to the worm wheel, parts is few in number and an assembling property is good, thereby enabling reduction in cost.

The above and further objects and features of the invention will more fully be apparent from the following detailed description with accompanying drawings.

DETAILED DESCRIPTION OF THE INVENTION

Detailed description will be given of the present invention with reference to the figures showing embodiments thereof.

(First Embodiment)

Figure 1:
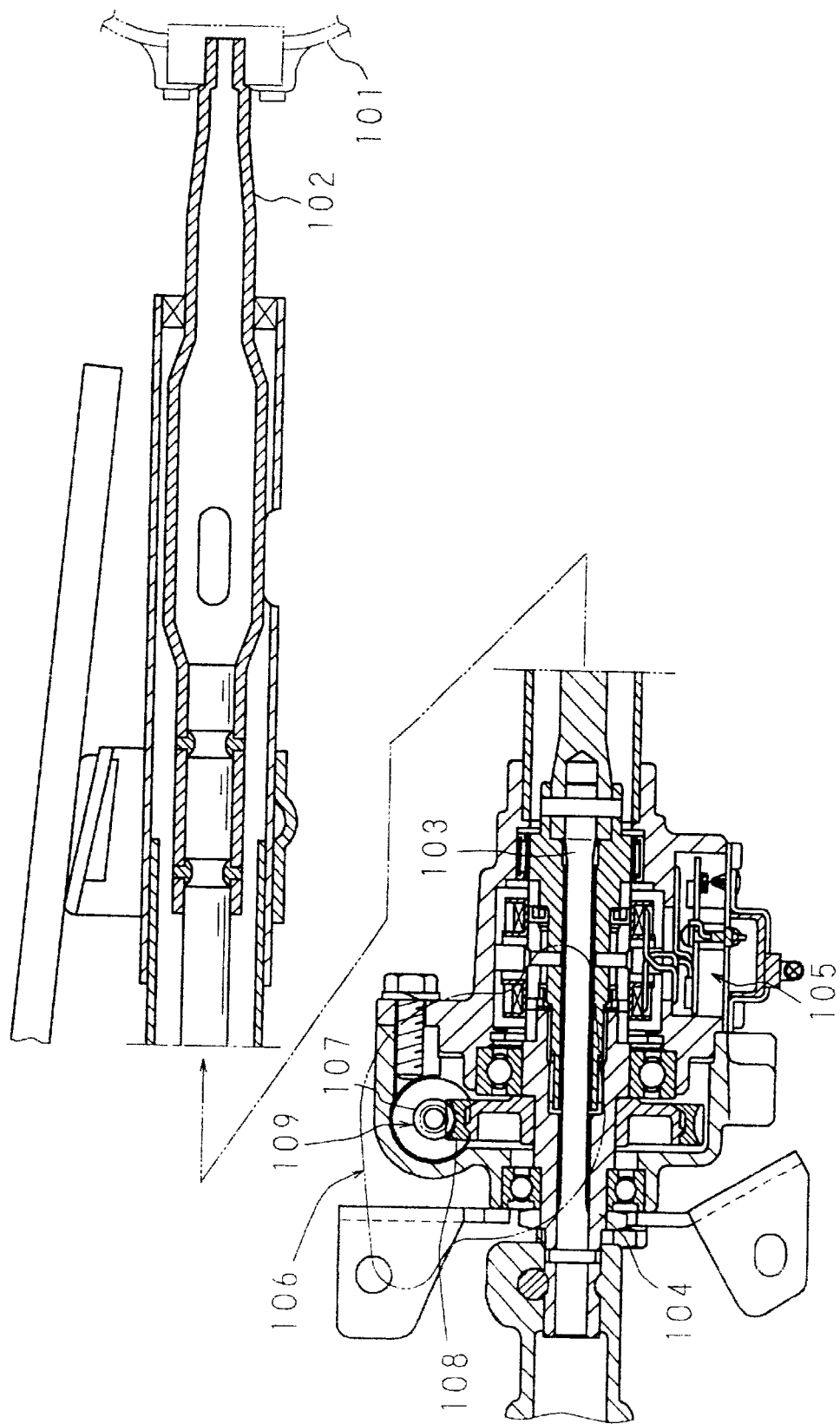
FIG. 1 is a sectional view of an example of a conventional electric power steering apparatus.
Figure 2:
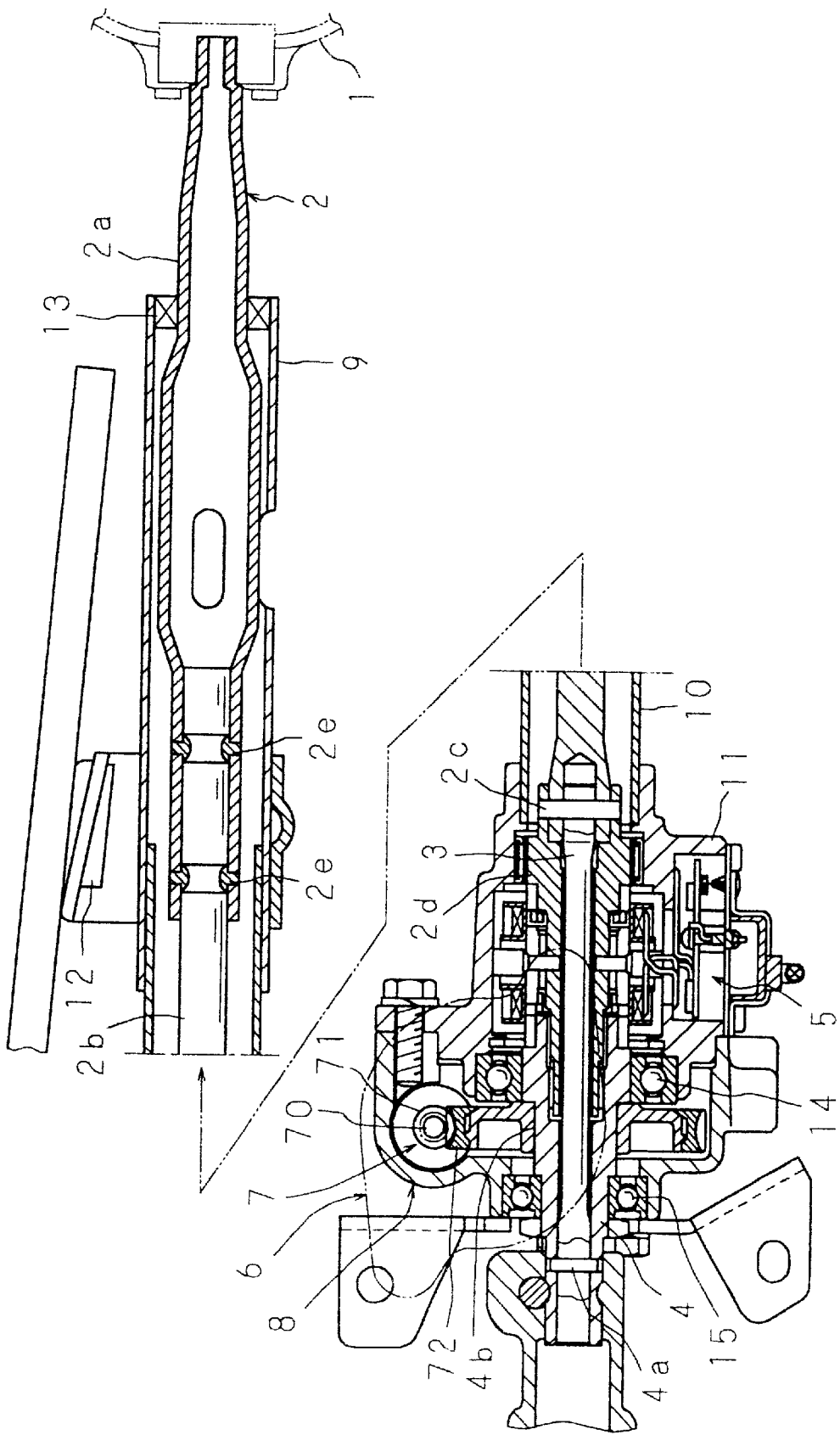
FIG. 2 is a sectional view of the whole of an electric power steering apparatus relating to the present invention.

FIG. 2 is a sectional view of the whole of an electric power steering apparatus relating to the present invention. The electric power steering apparatus, as shown in FIG. 2, includes: a first steering shaft 2 connected to a steering wheel 1; a torque sensor 5 sensing a steering torque by a relative rotary displacement of a second steering shaft 4 to the first steering shaft 2, the second steering shaft 4 being coupled with the first steering shaft 2 via a torsion bar 3; a constant velocity joint transmitting a rotary motion of the second steering shaft 4 to a steering mechanism; a reduction mechanism 7 having a worm 71 and a worm wheel 72, which reduces a rotary motion of an electric motor 6 for steering assistance driven based on a sense result of the torque sensor 5 and transmits the reduced rotary mot ion to the second steering shaft 4; a first shaft housing 9 and a second shaft housing 10 to enclose and support the first steering shaft 2; a sensor housing 11 accommodating the torque sensor 5; a gear housing accommodating the reduction mechanism 7; and a mounting bracket for mounting the first shaft housing 9 on a vehicle body. Herein, the electric motor 6 is attached to the gear housing 8 and the other end portion of the first shaft housing 9 is fitted to one end portion of the second shaft housing 10 so as to enable a relative movement in the longitudinal direction.

The steering wheel 1 is mounted to one end of the first steering shaft 2. An intermediate portion of the first steering shaft 2 includes: a first shaft body 2a having a cylindrical form supported by the first shaft housing 9 having a cylindrical form with a bearing 13 interposed therebetween; a second shaft body 2b having a rod-like form, not capable of relative rotation, and fitted to the other end of the first shaft body 2a so as to be movable in the longitudinal direction: and a third shaft body 2d having a cylindrical form, connected to the second shaft body 2b through a dowel pin 2c. Between the first and second shaft bodies 2a and 2b, inserted is a shock energy absorber 2e made of a synthetic resin, absorbing shock energy, which acts on a driver through the steering wheel 1. Further, between the third shaft body 2d and the second steering shaft 4, disposed is the torque sensor 5.

The second steering shaft 4 having a cylindrical form is fitted to the other end portion of the torsion bar 3 and coupled with it through a dowel pin 4a, wherein one end of the torsion bar 3 is coupled with the other end of the second shaft body 2b through the dowel pin 2c. An intermediate portion in the longitudinal direction of the second steering shaft 4 is rotatably supported by the gear hosing 8 with a pair of bearings 14 and 15 interposed therebetween, and the worm wheel 72 is mounted, in fit, on a fitting portion 4b of the second steering shaft 4 between the bearings 14 and 15.

The second shaft housing 10, as shown in FIG. 2, is fitted to the first shaft hosing 9 at one end portion thereof and further fitted to the sensor housing 11 at the other end portion thereof. In absorption of the above described shock energy, the second shaft housing 10 allows the first shaft housing 9 to move in the longitudinal direction toward or away from the second shaft housing 10.

Figure 3:
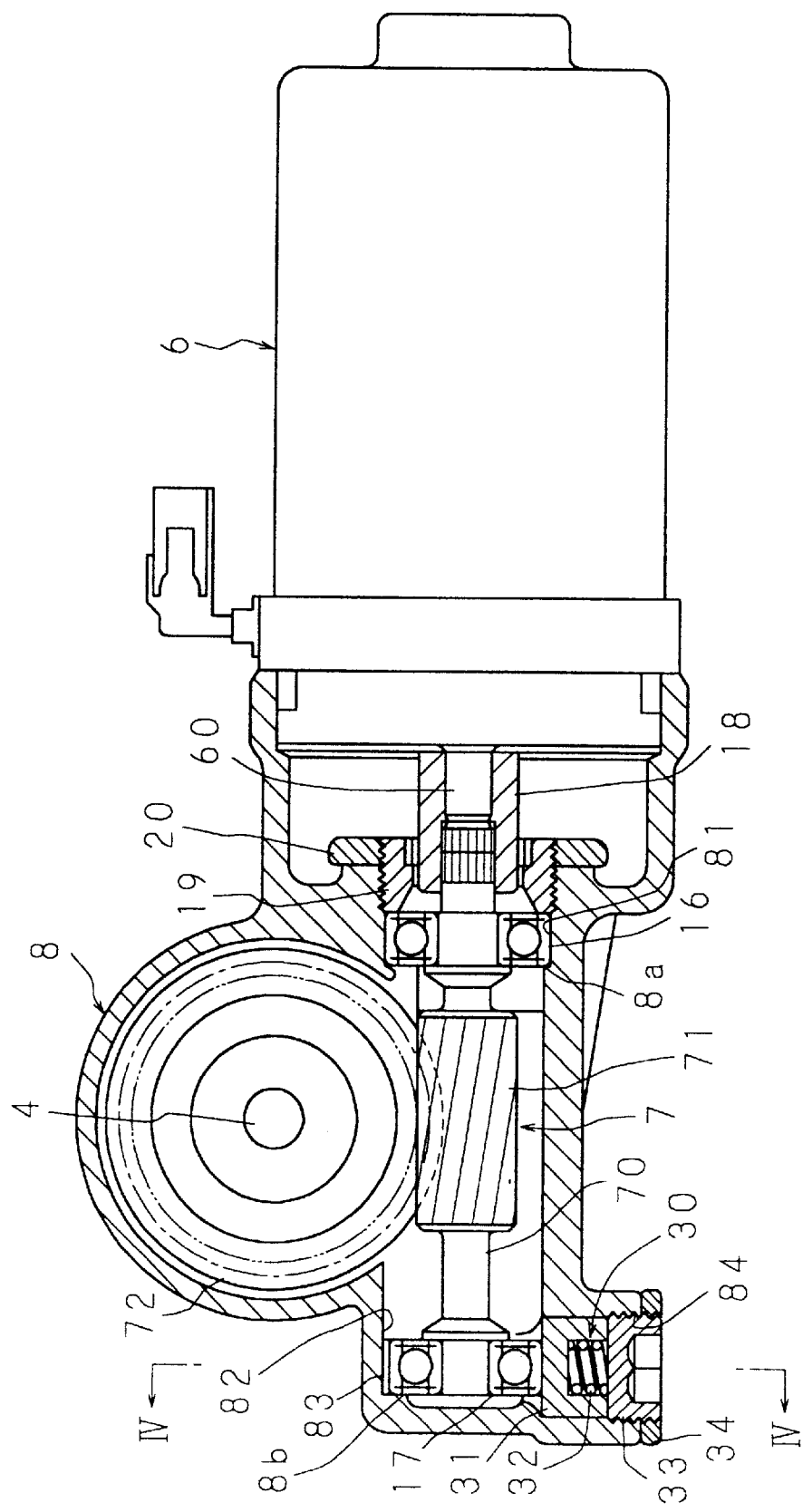
FIG. 3 is a sectional view of a reduction mechanism and an electric motor combined in a first embodiment of an electric power steering apparatus relating to the present invention.
Figure 4:
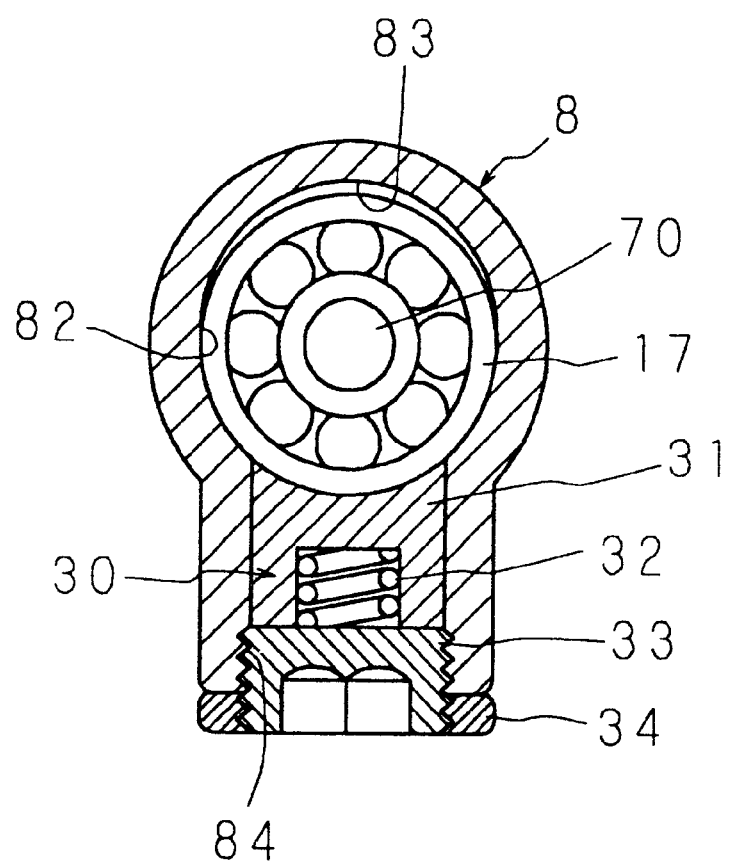
FIG. 4 is a sectional view taken on line of IV to IV of FIG. 3.

FIG. 3 is a sectional view of the reduction mechanism and the electric motor combined and FIG. 4 is a sectional view taken on line of IV to IV of FIG. 3. The reduction mechanism 7 includes: the worm 71 formed integratedly in an intermediate portion of the worm shaft 70 in the longitudinal direction, coupled with an output shaft 60 of the electric motor 6; and the worm wheel 72 fixedly held at the fit portion 4b of the second steering shaft 4. A rotary motion of the electric motor 6 is reduced in velocity by the engagement between the worm 71 and the worm wheel 72 to be transmitted to the second steering shaft 4 and further, the rotary motion reduced in velocity is transmitted to the steering mechanism through the constant velocity joint.

The worm shaft 70 is disposed so as to be perpendicular to the axial line of the second steering shaft 4 and both end portions of the worm shaft 70 in the longitudinal direction are rotatably supported in first and second bearing holes 81 and 82, respectively, of the gear housing 8 with first and second bearings 16 and 17, both being ball bearings, interposed therebetween. The worm 71 is integratedly disposed in the worm shaft 70 between the first and second bearings 16 and 17. Further, one end portion of the worm shaft 70 is inserted into a connecting cylinder 18 in spline fit to couple with the output shaft 60.

The worm shaft 70 in the gear housing 8 described above is supported such that the second bearing 17 located opposite the output shaft 60 is deflectable toward the worm wheel 72. A biasing member 30 including a spring body biasing the second bearing 17 in the deflective direction is provided to the gear housing 8.

A concave portion 83 of a circular arc in section accepting movement of the second bearing 17 is formed in a second bearing hole 82 and the second bearing 17 is deflected into the concave portion 83. Further, a tapped hole 84 is formed through the gear housing 8 opposite the concave portion 83 in the second bearing hole 82 so as to open outside the gear housing 8 and the biasing member 30 is mounted in the tapped hole 84. It should be appreciated that since a deflection of the second shaft 17 toward the worm wheel 72 is about 30 $\mu$m, the deflection can be sufficiently absorbed by a backlash amount of a connecting portion between the worm shaft 70 and the output shaft 60 and a backlash amount of the first bearing 16.

The biasing member 30 has a curved surface of a circular arc in section contacting an outer circumferential surface of the second bearing 17 and a spring supporting section, and, to be detailed, includes: a spring supporter 31 inserted so as to be movable toward the second bearing hole 82; a spring body 32 of a coil spring supported by the spring supporter 31; a screw body 33 adjusting a flexure amount of the spring body 32 contracted in the tapped hole 84; and a lock nut 34 screwed on the screw body 33. The biasing member 30 deflects the second bearing 17 toward the concave portion 83 by operating the screw body 33, in a state where the lock nut 34 is loose, to move the spring supporter 31.

In the gear housing 8, provided are a first regulatory portion 8a regulating movement of the first bearing 16 in the acting direction of a thrust load thereon and a second regulatory portion 8b regulating movement of the second bearing 17 in the acting direction of a thrust load thereon. A screw body 19 in contact with the outer ring of the first bearing 16 is tightly screwed in the end portion closer to the electric motor 6 of the first bearing hole 81 and thereby, an operating force of the screw body 19 is transmitted to the worm shaft 70 through the first bearing 16 to prevent backlash of the worm shaft 70 in the longitudinal direction. A lock nut 20 in loose screwing with the screw body 19 in this state is then tightly screwed to lock a rotary motion of the screw body 19.

In the first embodiment, in assembly of the worm shaft 70 into the electric power steering apparatus, the second bearing 17 is moved by operating the screw body 33 to force the worm 71 to be put in contact with the worm wheel 72, then the worm wheel 72 is turned to confirm no backlash therebetween and thereafter, the lock nut 34 is tightly screwed to retain such an adjusted state. Therefore, backlash is properly eliminated without receiving any influence of dimensional errors of the parts such as the worm 71, thereby enabling a production yield to increase.

When backlash is produced due to increase in wear of teeth of the worm 71 and the worm wheel 72, the lock nut 20 and the screw body 19 are loosened to release the second bearing 17 from a constrained condition, such that the second bearing 17 and the worm shaft 70 are deflected toward the concave portion 83 by a force of the spring body 32, with the result that no backlash becomes present. Further, in this case, if backlash cannot be eliminated only by the force of the spring body 32, the lock nut 34 is loosened and the screw body 33 is operated to adjust a flexure amount of the spring body 32, such that the second bearing 17 is deflected toward the concave portion 83, thereby enabling backlash to be properly eliminated.

(Second Embodiment)

Figure 5:
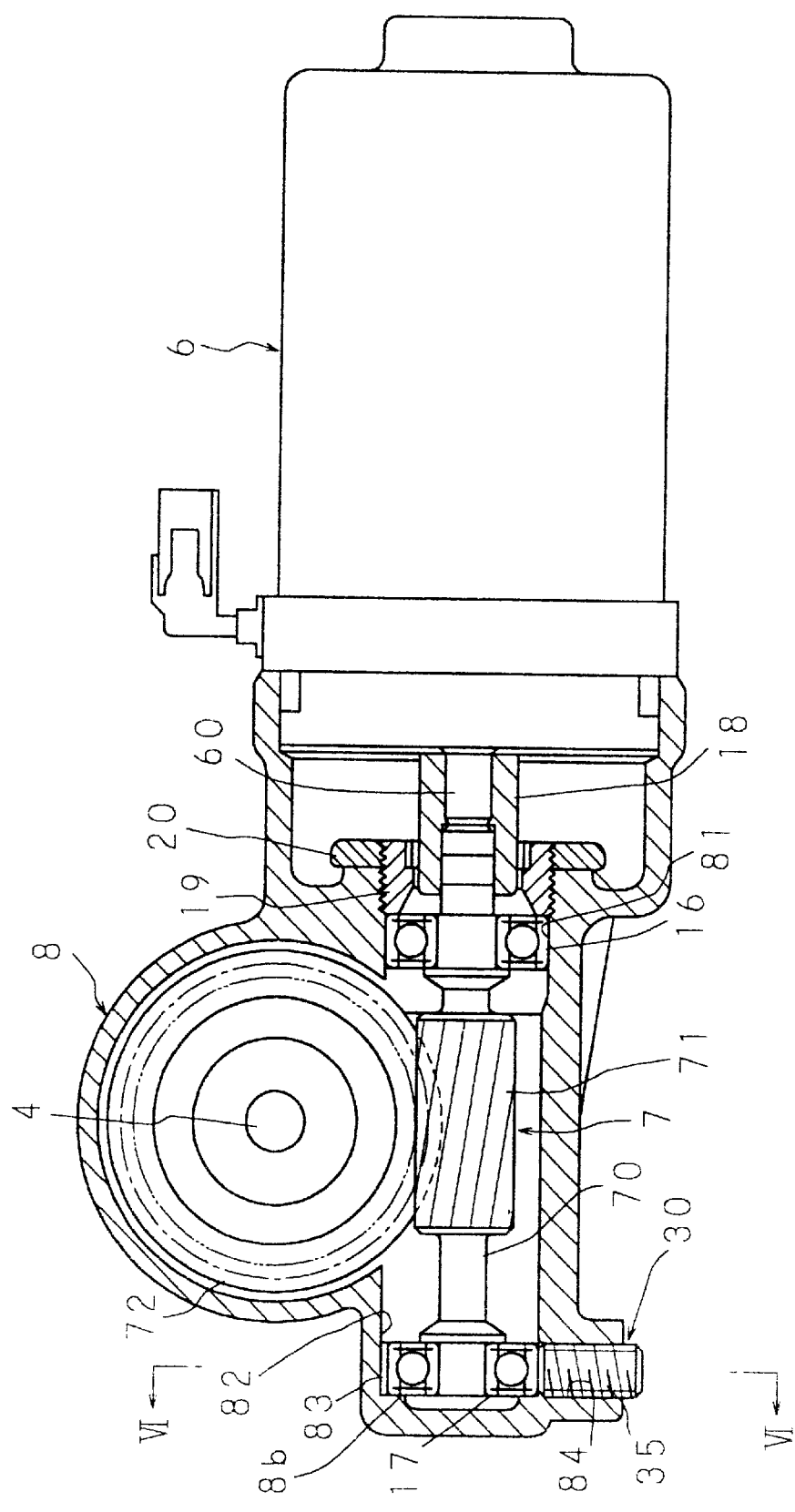
FIG. 5 is a sectional view of a reduction mechanism and an electric motor combined in a second embodiment of an electric power steering apparatus relating to the present invention.
Figure 6:
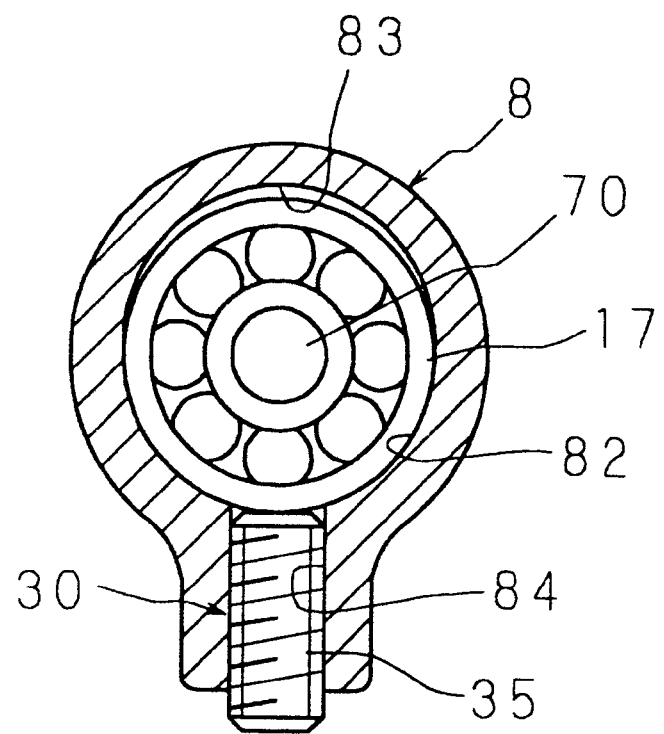
FIG. 6 is a sectional view taken on line of VI to VI of FIG. 5.

FIG. 5 is a sectional view of the reduction mechanism and the electric motor combined in a second embodiment and FIG. 6 is a sectional view taken on line of VI to VI of FIG. 5. The electric power steering apparatus of the second embodiment has a structure in which comparing with the first embodiment, neither of the spring body 32 and the spring supporter 31 of the above-mentioned biasing member 30 is present, a screw body 35 is screwed in a tapped hole 84 of the gear housing 8, the screw body 35 being put in contact with the outer circumferential surface of the second bearing 17; the second bearing 17 is deflected toward the concave portion 83 by operating the screw body 35 and further, no first regulatory portion 8a is present. The other parts of the structure and workings thereof are the same as those in the first embodiment, and therefore the same reference marks are attached to parts in common use with both embodiments and descriptions thereof are omitted.

In the second embodiment, when the worm shaft 70 is assembled into the apparatus, the procedure goes as follows:

The second bearing 17 is moved by operating the screw body 35 in a loose condition of the lock nut 20 and the screw body 19 to force the worm 71 to be put in contact with the worm wheel 72. After confirmation that no backlash is present between the worm 71 and the worm wheel 72 by turning the worm wheel 72, the screw body 19 is operated to transmit an operating force thereof to the outer ring of the second bearing 17 through the outer ring of the first bearing 16, balls thereof, the inner ring thereof, the worm shaft 70, the inner ring of the second bearing 17 and balls thereof. The outer ring is then pressed to the second regulatory portion 8b to constrain free deflection of the second bearing 17 and retain such an adjusted state by the screw body 35. Therefore, backlash can be properly eliminated without receiving any influence of dimensional errors of parts such as the worm 71, thereby enabling a production yield to increase.

When backlash is produced due to increase in wear of teeth of the worm 71 and the worm wheel 72, the lock nut 20 and the screw body 19 are loosened to release the second bearing 17 from a constrained condition and further, the screw body 35 is operated to deflect the second bearing 17 toward the concave portion 83, thereby enabling backlash to be properly eliminated.

(Third Embodiment)

Figure 7:
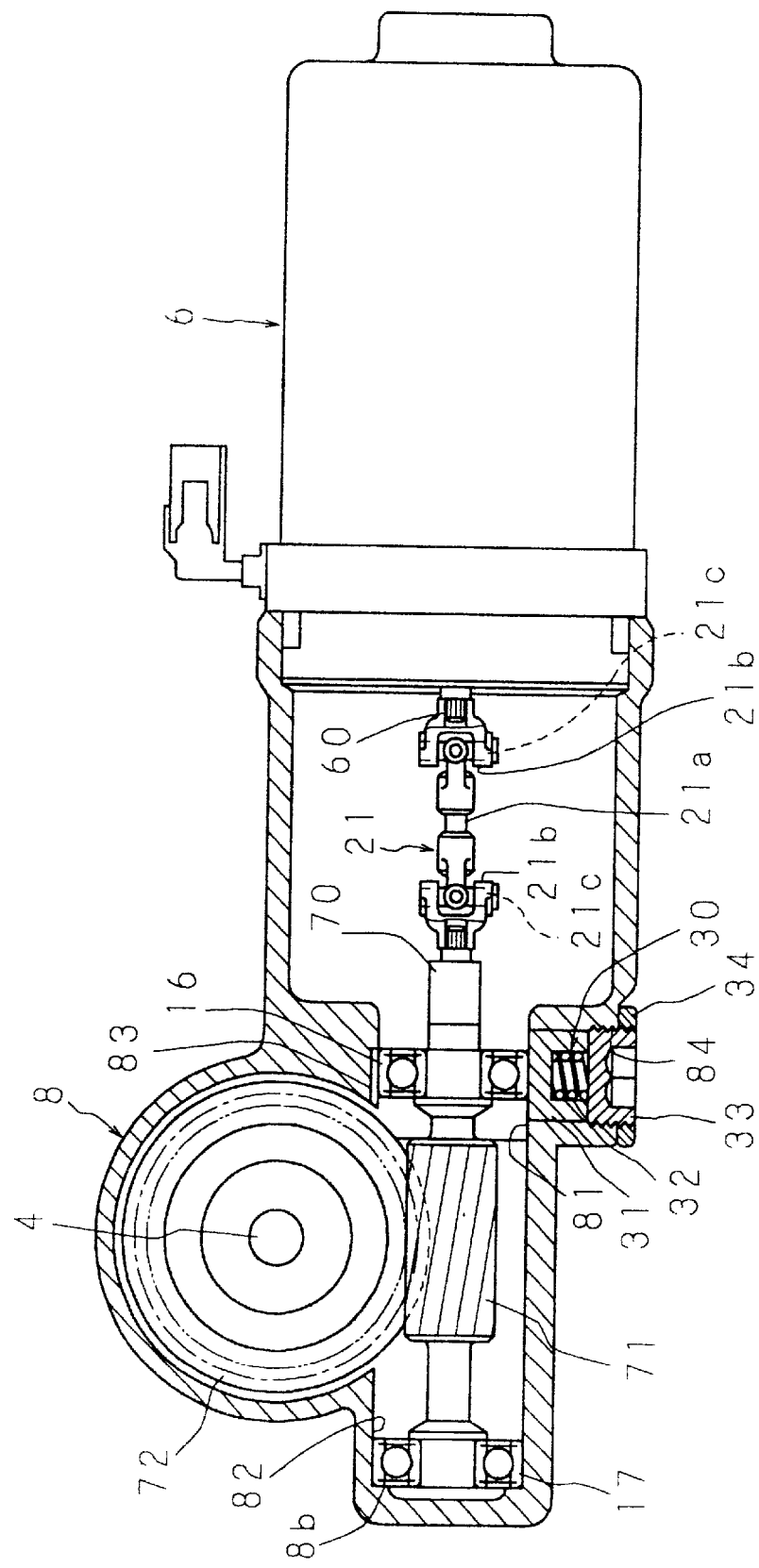
FIG. 7 is a sectional view of a reduction mechanism and an electric motor combined in a third embodiment of an electric power steering apparatus relating to the present invention.

FIG. 7 is a sectional view of the reduction mechanism and the electric motor combined in a third embodiment. The electric power steering apparatus of the third embodiment has a structure in which comparing with the first embodiment, the first bearing 16 is deflectable instead of the second bearing 17, the biasing member 30 biasing the first bearing 16 is provided and furthermore the output shaft 60 and the worm shaft 70 are coupled by a constant velocity joint 21 with neither of the screw body 19 and the lock nut 20. The other parts of the structure and workings thereof are the same as those in the first embodiment, and therefore the same reference marks are attached to parts in common use with both embodiments and descriptions thereof are omitted.

The constant velocity joint 21 is coupled with the output shaft 60 and the worm shaft 70, respectively, via yokes 21b and 21b, and joint crosses 21c and 21c provided at the both end portions of a shaft body 21a to transmit a rotary motion of the output shaft 60 to the worm shaft 70 at a constant velocity.

In the third embodiment, when the worm shaft 70 is assembled into the apparatus, the first bearing 16 is moved by operating the screw body 33 to force the worm 71 to be put in contact with the worm wheel 72 and after confirmation that no backlash is present between the worm 71 and the worm wheel 72 by turning the worm wheel 72, the lock nut 34 is tightly fastened to retain the adjusted state. Therefore, backlash can be properly eliminated without receiving any influence of dimensional errors of parts such as the worm 71, thereby enabling a production yield to increase.

When backlash is produced due to increase in wear of teeth of the worm 71 and the worm wheel 72, the first bearing 16 and the worm shaft 70 are forcibly deflected toward the concave portion 83 by a force of the spring body 32 to enable the backlash to be eliminated. In this case, if the backlash cannot be eliminated only by the force of the spring body 32, the lock nut 34 is loosened to adjust a flexure amount of the spring body 32 to deflect the first bearing 16 toward the concave portion 83, thereby enabling the backlash to be properly eliminated.

Further, in the third embodiment, since the worm shaft 70 is coupled with the output shaft 60 by the constant velocity joint 21, the worm shaft 70 can be smoothly rotated without receiving any influence of a magnitude of defection of the worm shaft 70.

It should be appreciated that the biasing member 30 may adopt a configuration of the second embodiment.

(Fourth Embodiment)

Figure 8:
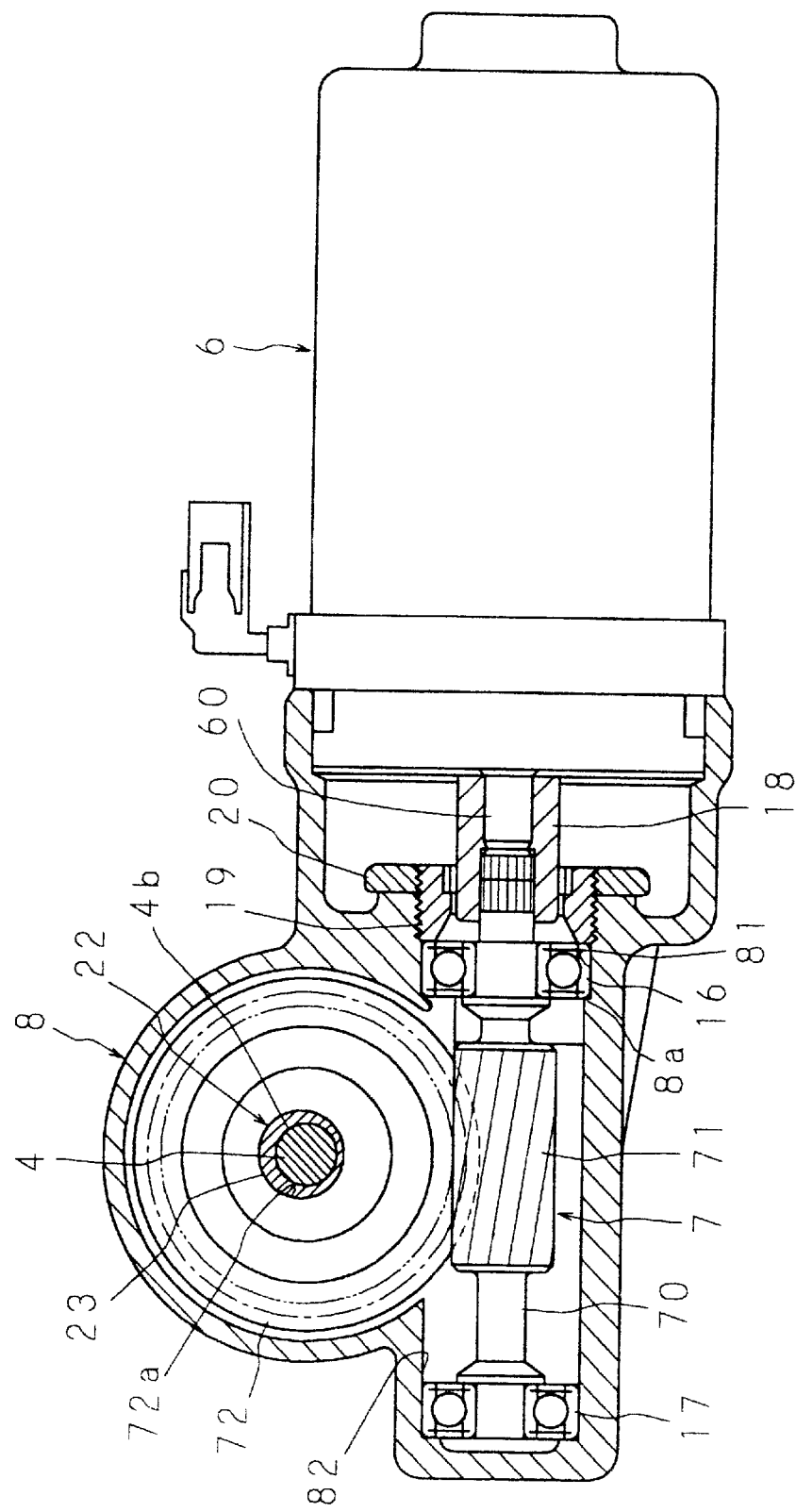
FIG. 8 is a sectional view of a reduction mechanism and an electric motor combined in a fourth embodiment of an electric power steering apparatus relating to the present invention.
Figure 9:
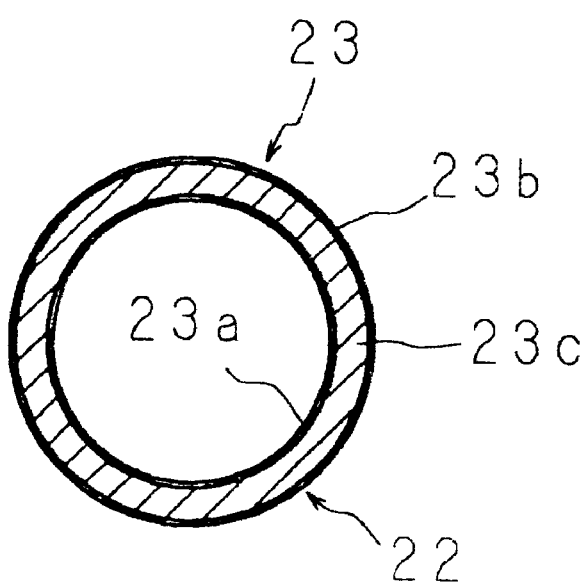
FIG. 9 is a sectional view of a biasing member in the fourth embodiment of an electric power steering apparatus relating to the present invention.

FIG. 8 is a sectional view of the reduction mechanism and the electric motor combined in a fourth embodiment and FIG. 9 is a sectional view of the biasing member. The electric power steering apparatus of the fourth embodiment has a structure in which comparing with the first embodiment, the worm wheel 72 is deflectable toward the worm shaft 70 instead of deflection of the worm shaft 70, a biasing member 22 biasing the worm wheel 72 toward a deflecting direction thereof is provided with no biasing member 30 for the worm shaft 70. The other parts of the structure and workings thereof are the same as those in the first embodiment, and therefore the same reference marks are attached to parts in common use with both embodiments and descriptions thereof are omitted.

In the worm wheel 72, an inner diameter of a fit hole 72*a* formed at the inner periphery thereof is set larger than an outer diameter of the second steering shaft 4 in the fit portion 4*b* so as to allow the second steering shaft 4 to deflect toward the worm shaft 70. Further, the biasing member 22 is an elastic ring 23 fitted between the fit portion 4*b* of the second steering shaft 4 and the inner periphery, forming the fit hole 72*a*, of the worm wheel 72 so as to enable a rotational force to be transmitted therebetween.

The elastic ring 23 is constructed from an inner ring 23*a* and an outer ring 23*b* having a rigidity such as made of a metal or a synthetic resin, combined in one body using binding means such as vulcanizing bonding. Irregular streaks such as serration are formed on the inner circumferential surface, forming a fit hole, of the inner ring 23*a* and the outer circumferential surface of the outer ring 23*b*, and the inner ring 23*a* is fixed, by pressing, to the fit portion 4*b* while the outer ring 23*b* is fixed, by pressing, into the fit hole 72*a* of the worm wheel 72. With such a structure and an operation adopted, the worm wheel 72 becomes deflectable toward the worm shaft 70 via the second steering shaft 4. It should be appreciated that the worm wheel 72 becomes to be one body with the second steering shaft 4 through the elastic ring 23 to rotate in synchronism with the second steering shaft 4.

Fixing the elastic ring 23 may be realized by using a relative-rotation preventive member such as a pin or a key instead of fixing, by pressing, using irregular steaks such as serration provided on the inner ring 23*a* and the outer ring 23*b* as described above.

In the fourth embodiment, when the worm shaft 70 and the worm wheel 72 are assembled in the apparatus, for example, after the second steering shaft 4 is supported in the gear housing 8 by the bearings 14 and 15 (see FIG. 2), not only is the worm 71 put in contact with the worm wheel 72, but the worm 71 side portion of the elastic ring 23 is compressed in the radial direction as shown in FIG. 8 to deflect the worm wheel 72 toward the opposite side of the worm 71. Therefore, backlash can be properly eliminated without receiving any influence of dimensional errors of parts such as the worm 71, thereby enabling a production yield to increase.

When backlash is produced due to increase in wear of teeth of the worm 71 and the worm wheel 72, the worm wheel 72 is deflected toward the worm 71 by a force of the elastic ring 23, thereby enabling the backlash to be eliminated.

As the invention may be embodied in several forms without departing from the spirit of essential characteristics thereof, the present embodiments are therefore illustrative and not restrictive. Since the scope of the invention is defined by the appended claims rather than by the description preceding them, all changes that fall within metes and bounds of the claims, or equivalence of such meters and bounds thereof are therefore intended to be embraced by the claims.

What is claimed is:

1. An electric power steering apparatus, comprising:

an electric motor for steering assistance;

a worm shaft on which a worm is disposed;

a steering shaft on which a worm wheel is disposed and to which a rotary motion of said electric motor is transmitted through said worm shaft; and a biasing member biasing said worm wheel deflectable toward said worm shaft, in a deflective direction of said worm wheel, wherein said worm wheel is fitted to said steering shaft, and said biasing member includes an elastic ring fitted to a fit portion of said worm wheel to said steering shaft.

* * * * *